(12) United States Patent  
Chambers

(10) Patent No.: US 10,421,385 B2  
(45) Date of Patent: Sep. 24, 2019

(54) TRUCK LADDER RACK

(71) Applicant: Kevin M. Chambers, Ekron, KY (US)

(72) Inventor: Kevin M. Chambers, Ekron, KY (US)

( * ) Notice: Subject to any disclaimer, the term of this patent is extended or adjusted under 35 U.S.C. 154(b) by 0 days.

(21) Appl. No.: 15/731,731

(22) Filed: Jul. 25, 2017

(65) Prior Publication Data

US 2018/0154817 A1    Jun. 7, 2018

Related U.S. Application Data

(60) Provisional application No. 62/493,995, filed on Jul. 25, 2016.

(51) Int. Cl.
| | | |
|---|---|---|
| *B60P 3/40* | (2006.01) | |
| *B62D 33/023* | (2006.01) | |
| *B62D 33/02* | (2006.01) | |
| *B60R 9/00* | (2006.01) | |
| *B60R 9/048* | (2006.01) | |
| *B60R 9/06* | (2006.01) | |

(52) U.S. Cl.
CPC ........ *B60P 3/40* (2013.01); *B60R 9/00* (2013.01); *B60R 9/0485* (2013.01); *B60R 9/06* (2013.01); *B62D 33/023* (2013.01); *B62D 33/0207* (2013.01)

(58) Field of Classification Search
CPC ....... B60R 9/0485; B60R 9/048; B60R 9/045; B60P 3/40; B60P 3/42
USPC ................... 224/403, 405; 296/3
See application file for complete search history.

(56) References Cited

U.S. PATENT DOCUMENTS

| | | | | |
|---|---|---|---|---|
| 4,398,763 | A | * | 8/1983 | Louw .................... B62D 33/02 |
| | | | | 224/309 |
| 4,751,981 | A | | 6/1988 | Mitchell |
| 5,108,141 | A | | 4/1992 | Anderson |
| 5,137,320 | A | | 8/1992 | Christensen |
| 5,470,120 | A | | 11/1995 | Christensen |
| 5,494,327 | A | | 2/1996 | Derecktor |
| 5,584,521 | A | * | 12/1996 | Hathaway ............... B60J 7/104 |
| | | | | 224/405 |
| 5,628,540 | A | | 5/1997 | James |
| 5,662,254 | A | | 9/1997 | Lemajeur |
| 5,806,905 | A | | 9/1998 | Moore |
| 6,347,731 | B1 | * | 2/2002 | Burger ..................... B60R 9/00 |
| | | | | 224/402 |
| 6,832,798 | B1 | * | 12/2004 | Krause ................... B60R 9/042 |
| | | | | 224/403 |
| 6,971,563 | B2 | | 12/2005 | Levi |
| 7,104,429 | B1 | | 9/2006 | Flores |
| 7,758,091 | B1 | | 7/2010 | McCall |
| 8,322,582 | B2 | | 12/2012 | Flaherty |
| 8,403,191 | B2 | | 3/2013 | Russo |
| 8,444,034 | B2 | * | 5/2013 | Bennett .................. F41A 23/18 |
| | | | | 211/64 |
| 8,668,125 | B2 | | 3/2014 | Williams |
| 8,777,288 | B2 | | 7/2014 | Johnasen |

(Continued)

*Primary Examiner* — Scott T McNurlen  
(74) *Attorney, Agent, or Firm* — Carrithers Law Office, PLLC; David W. Carrithers

(57) ABSTRACT

A ladder rack which is removably mounted on the top edge of a pick-up bed for hauling ladders. The ladder rack can be quickly installed or removed from the pick-up bed without damaging the bed finish. Because the ladder rack is modular, the disassembled rack components can be folded into a space saving configuration for storage.

16 Claims, 3 Drawing Sheets

(56) References Cited

U.S. PATENT DOCUMENTS

| | | |
|---|---|---|
| 8,820,811 B1 | 9/2014 | Hemphill |
| 8,833,621 B2 | 9/2014 | Burkhardt |
| 9,132,784 B2 | 9/2015 | Harrison |
| 9,327,654 B2 | 5/2016 | Richter |
| 2003/0201656 A1 | 10/2003 | Ferguson |
| 2004/0211802 A1 | 10/2004 | Levi |
| 2008/0079277 A1 | 4/2008 | Wethington |
| 2008/0116008 A1 | 5/2008 | Wass |
| 2009/0166390 A1 | 7/2009 | Flaherty |
| 2011/0139842 A1* | 6/2011 | Sautter .................... B60R 9/045 224/324 |
| 2013/0229025 A1* | 9/2013 | Johnasen .................. B60P 3/00 296/3 |
| 2014/0191527 A1* | 7/2014 | Riley ........................ B60R 9/00 296/3 |
| 2015/0258940 A1 | 9/2015 | Breeden et al. |

\* cited by examiner

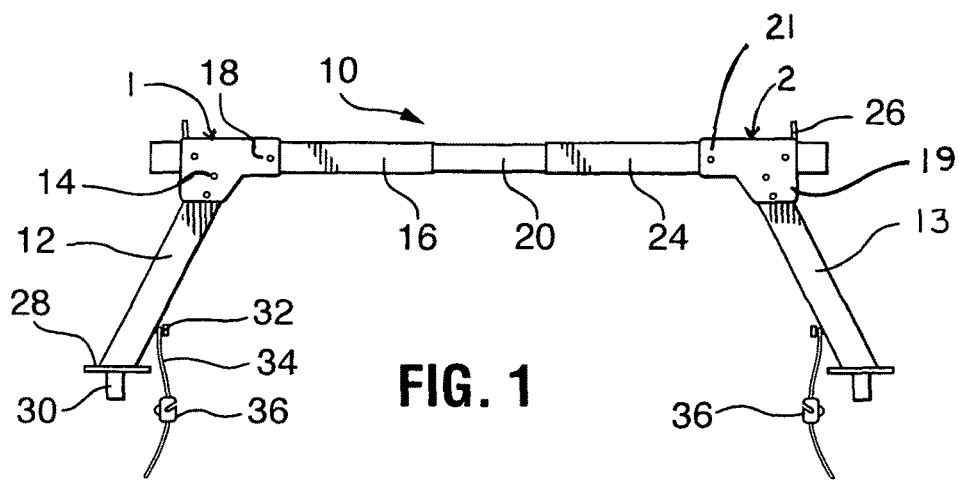
FIG. 1
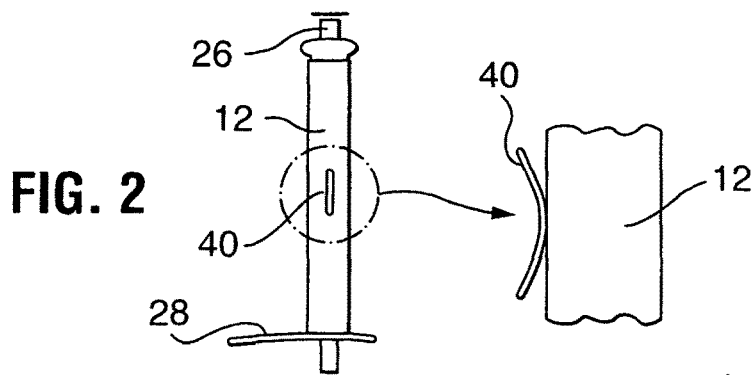
FIG. 2
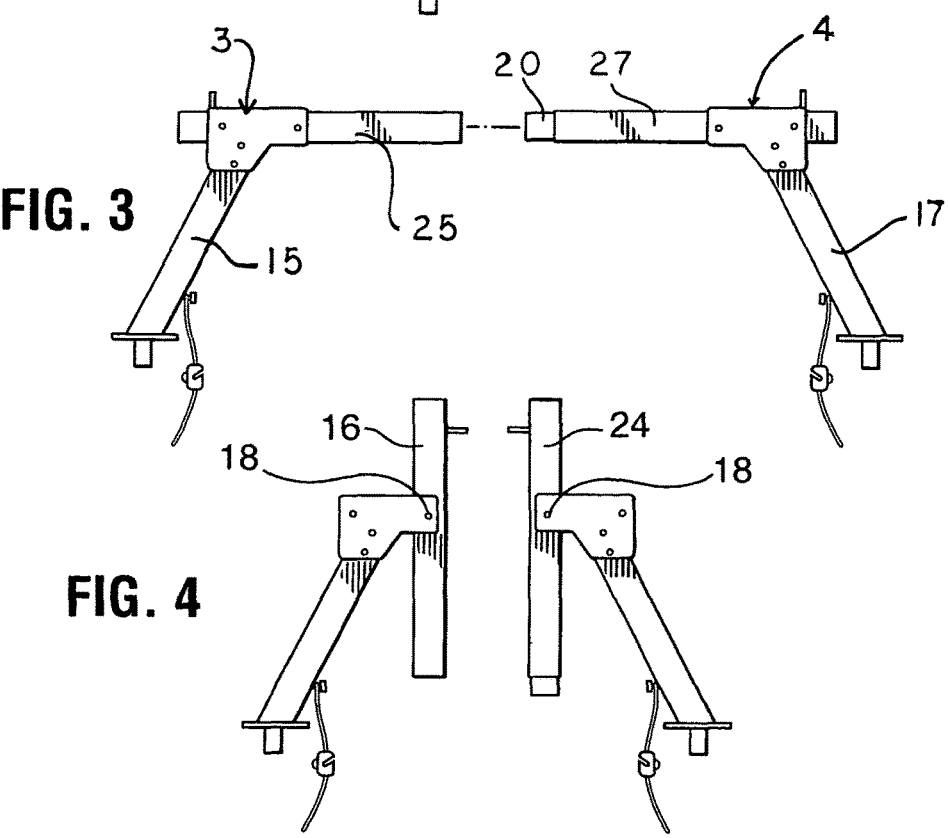
FIG. 3
FIG. 4

TRUCK LADDER RACK

CROSS REFERENCES TO RELATED APPLICATIONS

This application claims priority from U.S. Provisional Patent application Ser. No. 62/493,995 filed on Jul. 25, 2016 which is incorporated by reference herein in its entirety.

TECHNICAL FIELD

The present invention relates to the field of ladder racks used to carry a plurality of ladders on a pick-up truck.

BACKGROUND OF THE INVENTION

Maintenance and construction workers use ladders daily. Because these workers are mobile and their jobs from one day to the next or even one hour to the next may vary in location from a few hundred feet to many miles apart, the ability to carry one or many ladders along with other tools is absolutely necessary. Service trucks are typically fitted with tool boxes and sometimes with ladder racks. These service trucks are often times utility trucks know as pick-up trucks. Pick-up truck beds have sides which reach up to within two or so feet of the top of the cab. The sides of pick-up beds are covered on the outside with painted sheet metal which matches the cab and is therefore susceptible to scratches and dents when tools and racks are brought into contact. Pick-up truck owners typically want the outside of the trucks to remain as shiny and clean as possible. Ladder racks available today are not normally configured to be easily removed and therefore, the installation is semi-permanent and typically disfigures and possibly damages the pick-up truck bed due to the drilling of necessary attachment holes and other such modifications to the bed such as clamps which scratch the top bed rail.

Conventional truck ladders are taught in U.S. Pat. No. 9,132,784 incorporated by reference herein which teaches two frame members which attach to the top edge of the truck bed with vertical arms connected to an upper rail stretching across the width of the truck bed. The frame members are attached to the bed rails with clamps. U.S. Pat. No. 6,971,563 incorporated by reference herein which teaches two frame members similar to Harrison but attached angle rails running the length of the truck bed which then are placed on top of the bed side rails.

SUMMARY OF THE INVENTION

In accordance with the present invention, there is provided a device comprising, consisting of, or consisting essentially of a collapsible ladder rack assembly including a telescoping cross beam connecting arms that unfold to an obtuse angle providing a wide base and fold at a 90 degree angle including a ratchet unit extending therefrom connecting to a holding member such as a loop affixed to a sidewall or bed of a cargo bed anchoring the arm immovably thereto within 3 to 5 minutes. The ladder rack is fully collapsible and storable. It comes with four separate arms which separately insert into the truck bed stake pockets and have attached ratchets that tighten down the arms into a 90 degree angle configuration and includes pins that lock the arms into position. Once the arms are locked at a 90 degree angle, the two right arms have an inner sliding cross beam that connects to the opposing arms and snaps into place with push buttons.

The novel features comprise the sliding cross beam, folding arms that open and fold at a 90 degree angle, a bottom rod that insets into the truck bed stake pockets, and ratches that anchors the ladder rack to the truck bed.

A ladder rack for use with a pickup truck having opposed first and second side walls and a floor which forms the pickup cargo bed. The lateral dimension between the first and second side walls are dependent on the size of the bed. The first and second side walls have at least a front and rear stake pocket disposed in the top surface thereof and a tie down loop extending from a front and rear inner lower portion of the first and second side wall. The rack comprises or consists of a first leg support member mounted to a first front side pocket of the cargo bed and a second leg support member mounted to an opposing second front side pocket of the cargo bed. A third leg support member is capable of being mounted to a third rear side pocket of the cargo bed and a fourth leg support member is capable of being mounted to an opposing fourth rear side pocket of the cargo bed. The first leg support member includes a stake for insertion into the first front side pocket of the cargo bed. The second leg support member includes a stake for insertion into the second front side pocket of the cargo bed. The third leg support member includes a stake for insertion into the third rear side pocket of the cargo bed. The fourth leg support member includes a stake for insertion into the fourth rear side pocket of the cargo bed. The first leg support member angles inwardly toward the second front side pocket of the cargo bed. The third leg support member angles inwardly toward the fourth rear side pocket of the cargo bed. The first leg support member affixedly connects to and supports a pair of bottom flanges extending from a first joint having a pair of top flanges connecting to a first arm hingedly connecting to and extending inwardly therefrom. The second leg support member affixedly connects to and supports a pair of bottom flanges extending from a second joint having a pair of top flanges connecting to a second arm hingedly connecting to and extending inwardly therefrom. The third leg support member affixedly connects to and supports a pair of bottom flanges extending from a third joint having a pair of top flanges connecting to a third arm hingedly connecting to and extending inwardly therefrom. The fourth leg support member affixedly connects to and supports a pair of bottom flanges extending from a fourth joint having a pair of top flanges connecting to a fourth arm hingedly connecting to and extending inwardly therefrom. A front longitudinal center member slidably cooperatively engages a distal end of the first arm and the second arm. A rear longitudinal center member slidably cooperatively engages a distal end of the third arm and the fourth arm. A first ratchet includes a first leg strap removably attaching to a first leg holding means comprising a first leg projection and a first bed strap removably attaching to a first front cargo bed tie down loop. A second ratchet includes a second leg strap removably attaching to a second leg holding means comprising a second leg projection and a second bed strap removably attaching to a second front cargo bed tie down loop. A third ratchet includes a third leg strap removably attaching to a third leg holding means comprising a third leg projection and a third bed strap removably attaching to a third rear cargo bed tie down loop. A fourth ratchet includes a fourth leg strap removably attaching to a fourth leg holding means comprising a fourth leg projection and a fourth bed strap removably attaching to a fourth rear cargo bed tie down loop.

It is an object of the present invention to provide a removable and non-invasive installed ladder rack on a truck having a bed and side walls or stake pockets formed along the periphery of the bed.

It is an object of the present invention to provide a ladder rack featuring sliding cross beams, arms that open and fold at a 90 degree angle, bottom rods inserting into truck bed stake pockets, and connecting ratchets that anchors the ladder rack frame to the truck.

It is an object of the present invention to provide a ladder rack which can be easily removed without any tools so it can allow the vehicle to fit in a parking garage and not interfere with the laser readings in an automatic car wash.

It is an object of the present invention to provide a ladder rack that is removable in minutes without tools to permit entry in a parking garage or car wash.

It is an object of the present invention that is supported by four arms that are inserted into the truck bed stake pockets and include ratchets with straps that extend to tie down loops along the cargo bed sidewall or floor to tighten and anchor down the arms into a selected position.

It is an object of the present invention to provide that each arm opens into a 90 degree angle and includes an attachment pin cooperatively engaging a throughbore locking the arms into position.

It is an object of the present invention to include top cross member having an inner sliding cross bean that connects the opposing arms and snaps into place with spring loaded pins or ball members cooperatively engaging detents.

It is an object of the present invention to provide a ladder rack that is adjustable so that it is adaptable to fit any standard size pickup cargo bed.

It is an object of the present invention that is fully collapsible and portable.

It is an object of the present invention to provide a fully collapsible and storable ladder rack which can be installed or removed from a truck bed in about 3-5 minutes without tools.

It is an object of this invention to provide a ladder rack for a pick-up truck which is easily installable and easily removable and is capable of supporting a plurality of ladders.

It is an object of this invention to provide a ladder rack for a pick-up truck which can be installed and removed without damaging the painted finish of the pick-up truck bed.

It is an object of this invention to provide a ladder rack for a pick-up truck which is modular and folds into a compact storage configuration.

It is an object of this invention to provide a ladder rack for a pick-up truck which can be installed on pick-up beds with a variety of bed widths.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 1 is a front view of one of two ladder racks of the present invention;

FIG. 2 is a side view of the upright element of the present invention;

FIG. 3 is a front view of a partially disassembled one of two ladder racks of the present invention;

FIG. 4 is a front view of a partially folded one of two ladder racks of FIG. 3;

DESCRIPTION OF THE PREFERRED EMBODIMENTS

Figure 5:
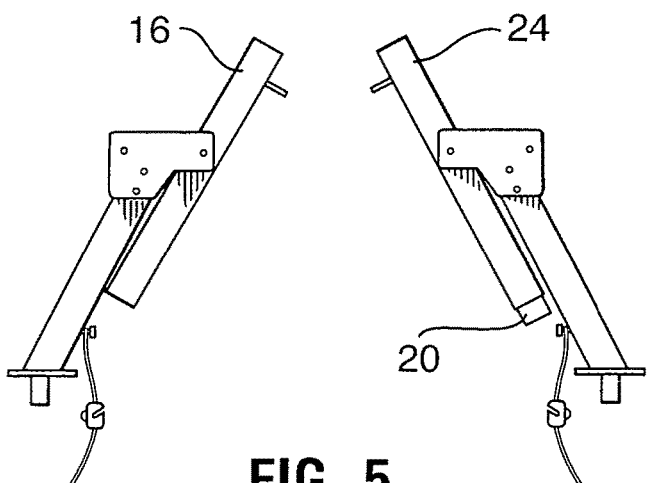
FIG. 5 is a front view of a fully folded one of two ladder racks of FIG. 3.

The ladder rack is for use with a truck having a bed with side stake pockets has at least opposed first and second side front stake pockets and at least opposed third and fourth rear side stake pockets. A floor defines a cargo bed and includes a tie down loops extending from a front and rear inner lower portion of a first and a second side wall or selected positions on the cargo bed near the front and rear side edges.

A ladder rack for use with a pickup truck having opposed first and second side walls and a floor which forms the pickup cargo bed. The lateral dimension between the first and second side walls are dependent on the size of the bed. The first and second side walls have at least a front and rear stake pocket disposed in the top surface thereof and a tie down loop extending from a front and rear inner lower portion of the first and second side wall.

The rack comprises or consists of a first front ladder leg support member 12 capable of being mounted to a first front side stake pocket or standard 19 of a side rail 9 of the cargo bed and a second front opposing ladder leg support member 13 mounted to an opposing second front side pocket of the cargo bed. A third rear ladder leg support member 15 is capable of being mounted to a third rear side pocket of the cargo bed adjacent the first front ladder leg support member 12 and a fourth rear ladder leg support member 17 is capable of being mounted to an opposing fourth rear side pocket of the cargo bed adjacent the second front ladder support member 13.

The first front ladder leg support member includes a stake or standard peg 30 for insertion into the first front side pocket of the cargo bed. The second front ladder leg support member includes a stake for insertion into the second front side pocket of the cargo bed. The third rear ladder leg support member includes a stake for insertion into the third front side pocket of the cargo bed. The fourth rear ladder leg support member includes a stake for insertion into the fourth front side pocket of the cargo bed.

The first front ladder leg support member 12 angles inwardly toward the second front ladder leg support member 13. The third rear ladder leg support member 15 angles inwardly toward the fourth rear ladder support member 17. The first ladder leg support member 12 affixedly connects to and supports a pair of spaced apart aligned bottom flanges 19 extending from a first joint 1 having a pair of spaced apart top flanges 21 connecting to a first swing arm 16 hingedly connecting to and extending inwardly therefrom. The second ladder leg support member 13 affixedly connects to and supports a pair of spaced apart aligned bottom flanges 19 extending from a second joint 2 having a pair of spaced apart aligned top flanges 21 connecting to a second opposing swing arm 24 hingedly connecting to and extending inwardly therefrom. The third rear ladder leg support member affixedly connects to and supports a pair of spaced apart aligned bottom flanges 19 extending from a third joint 3 having a pair of spaced apart aligned top flanges 21 connecting to a third swing arm 15 hingedly connecting to and extending inwardly therefrom. The fourth rear ladder leg support member 17 hingedly connects to and supports a pair of spaced apart aligned bottom flanges 19 extending from a fourth joint 4 having a pair of spaced apart aligned top flanges 21 connecting to a fourth opposing swing arm 27 hingedly connecting to and extending inwardly therefrom.

A front longitudinal center member or sliding core cross member beam 20 slidably cooperatively engages and connects a distal end of the first awing arm 16 and the second swing arm 24. A rear longitudinal center member 20 slidably cooperatively engages a distal end of the third swing arm 25 and the fourth swing arm 27.

A ratchet assembly 36 includes a ladder leg support member strap 34 removably attaching to a ladder leg holding means defining a retaining anchor pin for holding the ladder leg support member strap 34 to a front cargo bed tie down loop.

More particularly, the individual components features are described in more detail as follows:

As shown in the FIG. 1, the telescoping sliding core 20 is slidingly received in opposing conduits extending from a pair of opposing pivot or swing arms 16 and 24. The sliding core or longitudinal center member 20 extends from a selected swing arm to a selected position in cooperative engagement with an opposing swing arm having a width necessary to extend across the cargo bed 5 of a pickup truck. A holding device such as a pin a push button 52 includes a plunger 50 located on the sliding core cross member beam 20 which cooperatively engages a selected one of a plurality of corresponding sized shaped and aligned apertures 46 of each swing arm 16 and 24. A locking pin 44 is provided to hold each pivot or swing arm at a selected angle of about 90 degrees with respect to the ladder legs so that the swings extend horizontally toward one another over the cargo bed. The locking pin 44 cooperatively engages a throughbore in the hinge assembly 1, 2, 3, 4, for locking the arms into position. Ratchets 36 and straps 34 secure the ladder legs 12 to the truck bed with one distal strap end attaching to the arms or legs and the opposing distal ends of the straps removably hooking into factory truck anchorage points in the bed along the side walls.

As best shown in FIG. 2, an upright member defines a ladder leg 12 or ladder support arm for cooperative engagement with standards in the top of the pickup truck bed. The base member 28 bottom of each ladder leg has a slight bend to act as a counter pressure to secure and prevent the ladder rack frame from moving forward and backward. Once the ratchet straps are tight, the unit will be supported by and held to the side rails 9 of the truck cargo bed without requiring holes to be drilled in the truck cargo bed or clamps to be used to hold the support leg to the truck cargo bed.

A convex base member 28 is mounted to the bottom of the upright ladder leg and reinforced to provide additional support for resting on the upper rail of the cargo bed and prevent rocking. A peg 30 extends from the bottom of the ladder leg of corresponding size and shape with the cargo box standard formed in the top of the side rail 9 of the cargo box for positioning the ladder leg. The base member rests on a rubberized mat to keep the base member form scratching the surface of the truck cargo bed top rail as it is tightened with the ratchet strap. The concave base is longer on the side of the upright ladder leg facing the inner portion of the truck bed with respect to each ladder leg, so that the short portion of the concave base extends from the rear of the rear ladder leg and the short portion of the front concave base extends toward the front portion of the cargo bed adjacent the cab. The short end prevents the base member from extending past the rear of the truck or touching the truck cab. A fork or prong 40 is attached at its center to a medial portion of each base member so that the prongs can be bent outward a slight angle of about 30 degrees providing an anchor for tying a rope or tether to aid in holding ladders securely in place that are mounted onto the ladder rack. A rubber coated L-bracket 26 is attached to the top of each ladder leg by a bolt so that a flange extends above the leg providing a ladder stop.

As illustrated in FIG. 3, the ladder leg is secured to the cargo box or bed of the pickup truck by a ratchet and strap assembly by hooking the ladder leg to a selected anchor in the truck bed. The telescoping longitudinal member defined by a sliding center core is shown having each distal end slide into a proximate end of a pivot arm pivotally connected to a hinge supported by the ladder legs. The disassembly allows the assembly to be collapsed for storage.

FIG. 4 shows the pivot arms pivoting in the vertical direction upon removal of the locking pin and FIG. 5 shows the pivot arms aligned and nested against the ladder arms in a fully collapsed position so that the entire ladder arm and pivot arm assembly will fit into a storage bag.

Figure 6:
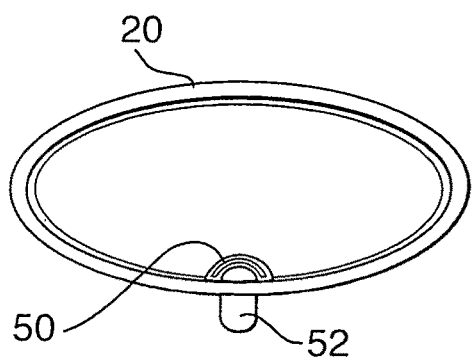
FIG. 6 is a cross-sectional view of the telescoping element of one of two ladder racks of the present invention.

The locking mechanism for holding the telescoping sliding core in position is shown in FIG. 6 as a elliptical or oval cross-section including a push button assembly whereby the push button 52 includes a plunger 50 located on the bottom of the sliding core cross member beam. The swing arms and sliding core member are formed having an elliptical cross section in order to aid alignment of the corresponding pre-drilled holes.

Figure 7:
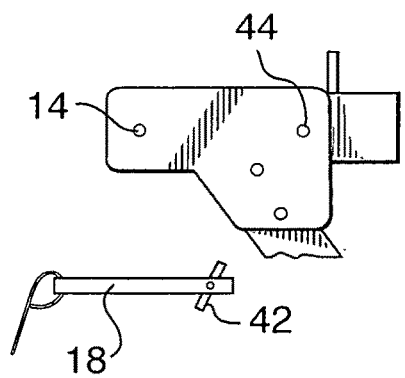
FIG. 7 is a close-in view of the connector element which connects the vertical element to either horizontal elements.

The hinge assembly for connecting the pivot arm to the ladder leg is shown in FIG. 7 whereby the leg support member hingedly connects to and supports a pair of spaced apart aligned flanges attached to the sides and extending from the top distal end of each ladder leg. Spaced apart aligned tabs extending from the flanges having aligned through holes 14 for securing the pivot arms extending there through. Pivot pins 18 with retaining wires 42 allow the pivot arms to pivot within the tabs to from an aligned nested storage position to an extended position at a right angle to the ladder leg and horizontal alignment with an opposing pivot arm for corresponding engagement with a core member of a slightly smaller diameter than the pivot arms and have a corresponding cross section so that the distal end portions of the slidable core can be slidably disposed within the pivot arms in an erected position.

Figure 8:
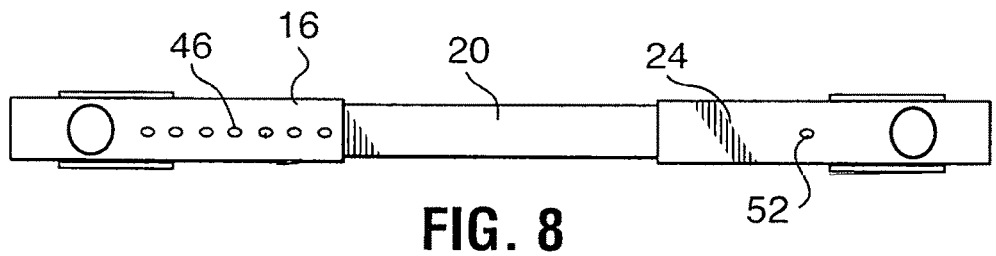
FIG. 8 is a bottom view of the three horizontal elements assembled.
Figure 9:
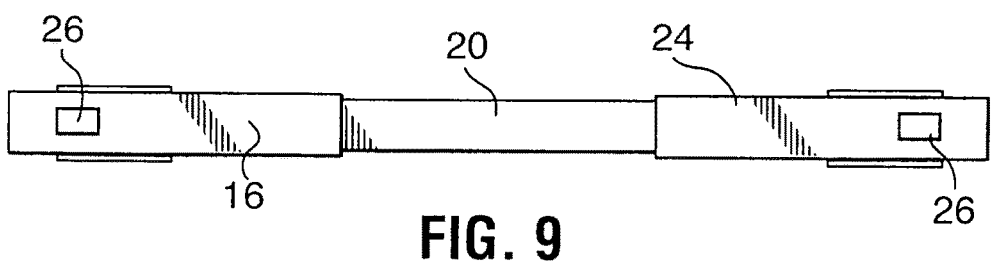
FIG. 9 is a top view of the three horizontal elements assembled.

The bottom of the pivot arm assembly as shown in FIG. 8 shows the flanges of the hinge and tabs on each side of the distal end of the pivot arms with a plurality of alignable through holes 46 in the pivot arm and slidable core on one end and a through hole 52 on the opposing end with push button assemblies on each end of the cross member assembly 10. Additional space is provided on a selected side of the slidable core beyond the push button so that can slide further into the pivot arm giving the slidable core additional linear footage to stay centered in a larger section or portion of the cross member assembly increasing the total weight limit capacity of the ladder rack unit. FIG. 9 is a top view of the cross member assembly showing the flanges of the rubber coated L-bracket, hinge tabs, core section and pivot arms.

Figure 10:
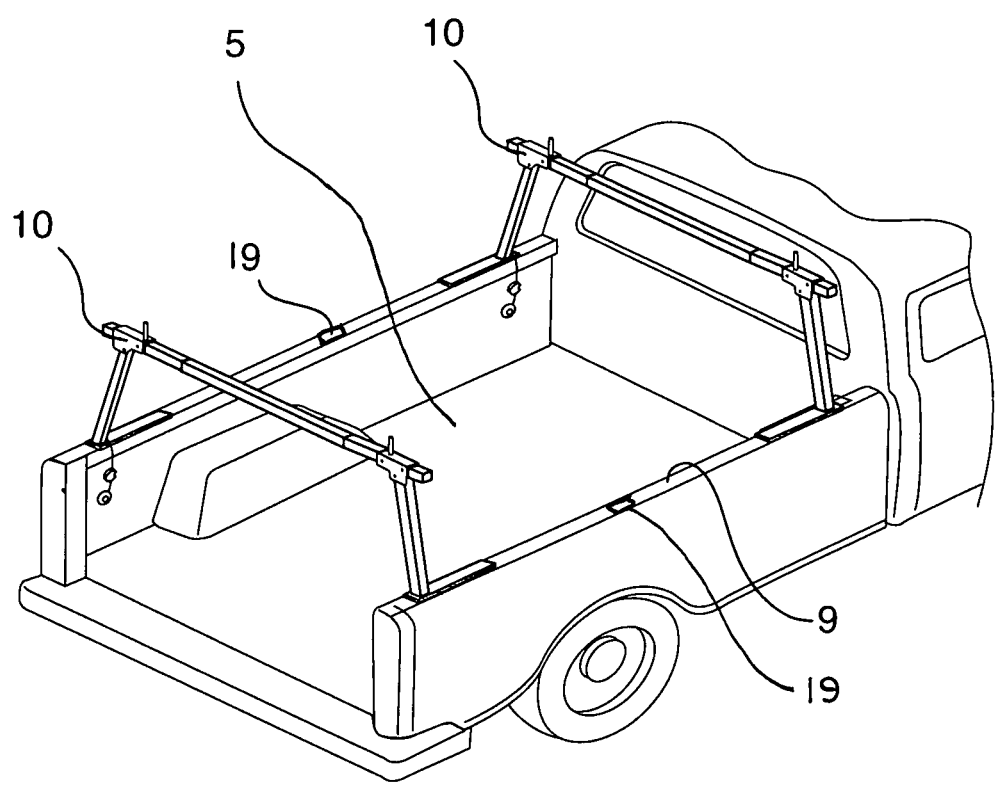
FIG. 10 is a perspective view of a pick-up bed with two ladder racks of the present invention installed thereon.

FIG. 10 shows the ladder rack assembly mounted on the cargo box side rails whereby the convex base members support the assembly and the ratchet strap assembly connects the anchor points of the cargo bed with retaining anchor pin 32 attaching to the ladder legs.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

I claim:

1. A ladder rack adapted for use with a truck having a bed with side rail stake pockets including a tie down loop extending from said bed, said rack consists of:
   a first leg support member capable of being mounted to a first front side pocket of said cargo bed and a second leg support member capable of being mounted to an opposing second front side pocket of said cargo bed;
   a third leg support member capable of being mounted to a third rear side pocket of said cargo bed and a fourth leg support member capable of being mounted to an opposing fourth rear side pocket of said cargo bed;
   said first leg support member including a stake for insertion into said first front side pocket of said cargo bed;
   said second leg support member including a stake for insertion into said second front side pocket of said cargo bed;
   said third leg support member including a stake for insertion into said third rear side pocket of said cargo bed;
   said fourth leg support member including a stake for insertion into said fourth rear side pocket of said cargo bed;
   said first leg support member angled inwardly toward said second front side pocket of said cargo bed;
   said third leg support member angled inwardly toward said fourth rear side pocket of said cargo bed;
   said first leg support member affixedly connecting to and supporting a pair of bottom flanges extending from a first joint having a pair of top flanges pivotally connecting to a first swing arm having a elliptical cross section extending inwardly therefrom;
   said second leg support member affixedly connecting to and supporting a pair of bottom flanges extending from a second joint having a pair of top flanges pivotally connecting to a second swing arm having a elliptical cross section extending inwardly therefrom;
   said third leg support member affixedly connecting to and supporting a pair of bottom flanges extending from a third joint having a pair of top flanges pivotally connecting to a third swing arm having a elliptical cross section extending inwardly therefrom;
   said fourth leg support member affixedly connecting to and supporting a pair of bottom flanges extending from a fourth joint having a pair of top flanges pivotally connecting to a fourth swing arm having a elliptical cross section extending inwardly therefrom;
   a front longitudinal center member having a elliptical cross section slidably cooperatively engaging a distal end of said first swing arm and said second swing arm;
   a rear longitudinal center member having a elliptical cross section slidably cooperatively engaging a distal end of said third swing arm and said fourth swing arm;
   a first ratchet including a first leg support and removably attaching to said first leg support removably attaching to a first front cargo bed tie down loop;
   a second ratchet including a second leg strap removably attaching to said second leg support and removably attaching to a second front cargo bed tie down loop;
   a third ratchet including a third leg strap removably attaching to said third leg support and removably attaching to a third rear cargo bed tie down loop;
   said swing arm is extendable at a selected angle with respect to said leg support wherein said swing arm is held in a horizontal position;
   said swing arms are extendable at a selected angle with respect to said leg support members wherein said swing arms are held in a horizontal position;
   said swing arms are extendable at a selected angle of 90 degrees with respect to said leg support members;
   said leg support members including a convex base support member mounting to a bottom potion of said leg support members supported by said side rail of said cargo box;
   a bracket extending from a top distal end of each of said leg support members defining a flange forming a ladder stop; and
   a locking pin cooperatively engaging a plurality of through holes in each of said joints for releasably holding said swing arms in an extended position at a selected angle of at least 90 degrees with respect to said leg support members.

2. A collapsible modular ladder rack adapted for use with a pickup truck having a cargo bed, comprising:
   a front rack removably attachable to a pair of opposing front cargo bed rail stake pockets and a rear rack removably attaching to a pair of opposing rear cargo bed rail stake pockets,
   said front rack and said rear rack, comprising:
   a) a pair of opposing ladder leg support members having a stake peg extending from a bottom flange adapter for cooperatively engaging a stake pocket disposed in a side rail of a pickup truck bed;
   b) each one of said opposing ladder leg support members having a top distal end fixedly attaching to a pair of spaced apart aligned bottom flanges of a joint;
   c) each of said joints including a pair of spaced apart aligned top flanges pivotally connecting to a swing arm having an elliptical cross section extending inwardly therefrom;
   d) a telescoping cross member sized and shaped for orienting and adjustable sliding engagement with a distal end of opposing swing arms;
   e) means for pivotally holding each of said swing arms to said a top flange of said joint;
   f) means for cooperatively engaging a plurality of through holes in said joint for releasably holding said swing arm in an extended position at a selected angle of at least 90 degrees with respect to said ladder leg support members;
   g) said telescoping cross member and said opposing swing arms including an elliptical cross-sectional area for slidable alignment; and
   each of said ladder leg support members including a ratchet assembly including a ladder leg support member strap cooperatively engaging a ratchet for removably attaching to said ladder leg support member holding means for adjustably holding said ladder leg support member strap to a selected cargo bed tie down loop.

3. The collapsible modular ladder rack of claim 2, wherein the means for releasably holding said opposing swing arms in an extended position at a selected angle of at least 90 degrees with respect to said ladder leg support members comprises a retaining anchor pin for cooperative engagement with a plurality of alignable cross bore holes formed in said swing arms and said joints.

4. The collapsible modular ladder rack of claim 2, wherein said telescoping cross member is disposable within a selected swing arm for storage and transport.

5. The collapsible modular ladder rack of claim 2, wherein said swing arm is extendable at a selected angle of 90 degrees with respect to said ladder leg support members.

6. The collapsible modular ladder rack of claim 2, wherein said swing arm is extendable at a selected angle with respect to said ladder leg support members wherein said swing arm is held in a horizontal position.

7. The collapsible modular ladder rack of claim 2, wherein said swing arm is extendable at a selected angle of 90 degrees with respect to said ladder leg support members.

8. The collapsible modular ladder rack of claim 2, wherein said ladder leg support member includes a convex base support member mounting to a bottom portion of said ladder leg support member supported by said side rail of said cargo box.

9. The collapsible modular ladder rack of claim 8, wherein said convex base support member rests on a rubberized mat resting on a surface of said side rail.

10. The collapsible modular ladder rack of claim 2, including a rubber coated L-bracket attaching to said swing arm extending above said ladder leg support member forming a ladder stop.

11. The collapsible modular ladder rack of claim 2, wherein a prong is affixed to a a medial portion of said ladder leg support member, said prong bent outward slightly at a selected angle providing an anchor for tying a rope or tether for holding ladders securely in place mounted onto said ladder rack.

12. The collapsible modular ladder rack of claim 2, wherein said means for pivotally holding each of said swing arms to said a top flange of said joint comprises a hinge pin.

13. The collapsible modular ladder rack of claim 2, wherein said means for cooperatively engaging a plurality of through holes in said joint for releasably holding said swing arm in an extended position at a selected angle of at least 90 degrees with respect to said ladder leg support members is locking pin.

14. The collapsible modular ladder rack of claim 2, wherein opposing ladder leg support members are angling inwardly.

15. The collapsible modular ladder rack of claim 2, wherein said telescoping cross member is disposable within a selected one of said swing arms.

16. A collapsible modular ladder rack adapted for use with a pickup truck having a cargo bed, consisting of:
a front rack removably attaching to a pair of opposing front cargo bed rail stake pockets and a rear rack removably attaching to a pair of opposing rear cargo bed rail stake pockets,
said front rack and said rear rack, comprising:
a) a pair of opposing ladder leg support members having a stake peg for cooperatively engaging a stake pocket disposed in a side rail of a pickup truck bed;
b) said pair of opposing ladder leg support members angling inwardly;
c) each one of said opposing ladder leg support members having a top distal end fixedly attaching to a pair of spaced apart aligned bottom flanges of a joint;
d) each of said joints including a pair of spaced apart aligned top flanges pivotally connecting to a swing arm having an elliptical cross section extending inwardly therefrom;
e) a telescoping cross member having an elliptical cross section sized and shaped for orienting and adjustable sliding engagement with a distal end of opposing swing arms;
f) a hinge pin for pivotally holding each of said swing arms to said a top flange of said joint;
g) a locking pin cooperatively engaging a plurality of through holes in said joint for releasably holding said swing arm in an extended position at a selected angle of at least 90 degrees with respect to said ladder leg support members;
h) said telescoping cross member and said opposing swing arms including an elliptical cross-sectional area for slidable alignment;
said ladder leg support member includes a convex base support member mounting to a bottom portion of said ladder leg support member supported by said side rail of said cargo box;
said telescoping cross member is disposable within a selected one of said swing arms; and
each of said ladder leg support members including a ratchet assembly including a ladder leg support member strap cooperatively engaging a ratchet for removably attaching to said ladder leg support member holding means for adjustably holding said ladder leg support member strap to a selected cargo bed tie down loop.

* * * * *